United States Patent [19]

Tardy et al.

[11] Patent Number: 4,879,944
[45] Date of Patent: Nov. 14, 1989

[54] HYDRAULIC CONTROL VALVE

[75] Inventors: Maurice Tardy; Louis Marcon, both of Saint-Etienne, France

[73] Assignee: Bennes Marrel, Zone Industrielle Sud, Cedex, France

[21] Appl. No.: 181,690

[22] Filed: Apr. 14, 1988

[30] Foreign Application Priority Data

Apr. 23, 1987 [FR] France .............................. 87 05965

[51] Int. Cl.⁴ ............................................. F15B 11/00
[52] U.S. Cl. ...................................... 91/516; 91/532; 137/596.12; 137/625.68; 251/50
[58] Field of Search ...................... 137/625.68, 625.69, 137/596.12, 596; 251/50; 91/516, 532, 514, 515, 517, 508

[56] References Cited

U.S. PATENT DOCUMENTS

| | | | |
|---|---|---|---|
| 3,662,548 | 5/1972 | Suzuki et al. | 91/516 X |
| 3,841,095 | 10/1974 | Baker | 91/516 X |
| 4,057,073 | 11/1977 | Adams | 91/516 X |
| 4,170,246 | 10/1979 | Johnson | 137/596.12 |

FOREIGN PATENT DOCUMENTS

| | | |
|---|---|---|
| 2001680 | 7/1970 | Fed. Rep. of Germany . |
| 2080731 | 2/1971 | France . |
| 2449009 | 2/1980 | France . |
| 2065044 | 6/1981 | United Kingdom . |

Primary Examiner—Edward K. Look
Attorney, Agent, or Firm—Browdy and Neimark

[57] ABSTRACT

A hydraulic valve is adapted to be connected between a pressurized supply line and first and second lines feeding respective first and second circuits with different functions, such as the steering and braking functions of an automobile vehicle. It comprises a first control member adapted to connect the supply line to the first feed line, a two-way distributor device for the second feed line and a second control member adapted to apply to the second feed line a pressure proportional to the force exerted by the user damped by virtue of a dashpot effect.

16 Claims, 3 Drawing Sheets

4,879,944

HYDRAULIC CONTROL VALVE

BACKGROUND OF THE INVENTION

1. Field of the Invention

The present invention concerns a hydraulic control valve that can be used in a hydraulic circuit to perform two functions using a single hydraulic pump. It is more particularly, although not exclusively, concerned with a valve designed to be fitted to the hydraulic circuit of an automobile vehicle to enable simultaneous or independent supply of a hydraulic steering system and a system for braking the wheels of the vehicle.

2. Description of the prior art

In known hydraulic circuits it is common practise to use a hydraulic pump for each of the functions to be performed. This results in a relatively high unit cost for the installation.

The object of the invention is to avoid these disadvantages by providing a valve for controlling one of the two functions (braking, for example) of a two-function circuit supplied by a single hydraulic pump.

The device in accordance with the invention is naturally designed to be 100% safe, guaranteeing independent functioning of the two circuits.

SUMMARY OF THE INVENTION

The present invention consists in a hydraulic valve adapted to be connected between a pressurized supply line and first and second lines feeding respective first and second circuits with different functions, said valve comprising:

a first control member adapted to connect said supply line to said first feed line;

a two-way distributor device for said second feed line; and a second control member adapted to apply to said second feed line a pressure proportional to the force exerted by the user damped by virtue of a dashpot effect.

The invention will now be described in more detail and by way of non-limiting example only with reference to the appended drawings.

DESCRIPTION OF THE PREFERRED EMBODIMENT

Figure 1:
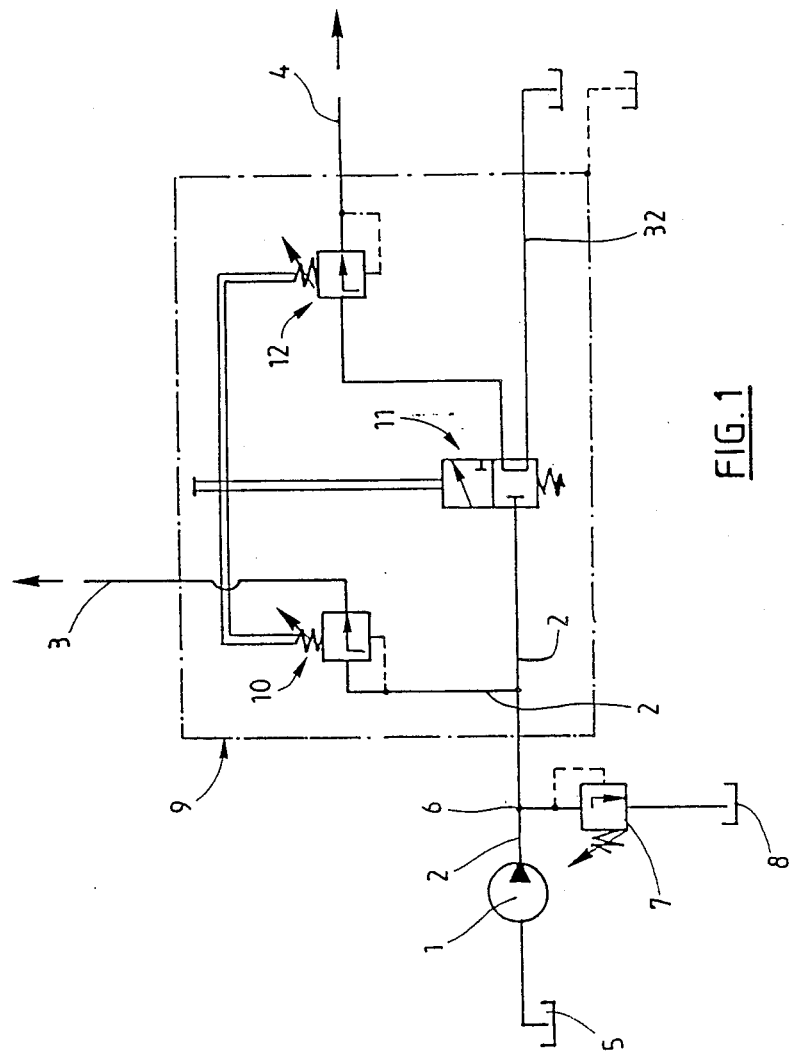
FIG. 1 is a hydraulic circuit diagram showing the principle of the connection provided by a control valve in accordance with the invention.

The equipment shown in the drawings comprises a hydraulic pump 1 adapted to feed oil under pressure into an outlet line 2 from which it can be distributed to a line 3 controling the steering circuit of a vehicle and-/or to a line 4 controlling the braking circuit of the same vehicle.

The pump 2 takes up oil from a reservoir 5 and discharges it towards a point 6, at a pressure with a maximum value in the order of 140 bars, for example. An adjustable pressure relief valve 7 is provided on a branch connection from the point 6: if operated because of excess pressure, the excess oil is returned to a reservoir 8. Beyond the point 6 the link 2 feeds the control valve 9 in accordance with the invention to feed the steering line 3 and/or the braking line 4.

The control valve 9 (see FIGS. 2 and 3) comprises three functional subsystems:

a steering control member 10 which connects the supply line 2 to the steering circuit 3 according to the known principle of an open center upstream circuit;

a two-position distributor device 11 for braking;

a braking control member 12 adapted to apply to the braking circuit 4 a pressure proportional to the force exerted by the driver on the brake pedal, with a dashpot type damper.

To this end the control valve 9 comprises a body 13 inside a bore 44 within which a hollow cylindrical main piston 14 can slide. The main piston ends with a head 15 around which slides the sleeve of a valve member 16 the rear end of which has a helical compression spring 17 bearing against it. The spring has thrust applied to it by a ring 18 in abutting engagement with a flange 19 on a plunger 20 whose rear end passes out through a fixed cap 21 closing off the body 13.

A seal 22 ensures that the sliding of the plunger 20 in the cap 21 is fluid-tight.

Inside the ring 18 a calibrated helical spring 23 is compressed between the flange 19 of the plunger 20 and the rear end 24 of the head 15 of the main piston 14.

A piston 25 slides inside the cylindrical front part of the main piston, its cross-section being calculated to balance the annular cross-section of the valve member 16 lying between:

its guide diameter 26 on the main piston 14, and its guide diameter 27 in the body 13.

The piston 25 also delimits a damper chamber 28 at the back of the blind bore within which it slides inside the main piston 14. Its foot 29 bears against a fixed screwthreaded plug 30 which closes off the body 13.

Four annular grooves are formed in the body 13 along the length of the main piston 14, namely:

a groove 31 connected to a brake return line 32;

a groove 33 connected to the brake line 4;

a groove 34 connected to the pressure inlet line 2; and a groove 35 connected to the steering line 3.

Lateral holes 36 and 37 formed in the hollow cylindrical wall of the main piston 14 are provided at the locations of the grooves 31 and 33, respectively, and they can be closed off in whole or in part by fluid-tight sliding within the bore of the stator body 13.

A circular edge 38 is provided on the outside of the main piston 14 to maintain communication between the grooves 34 and 33 to a more or less restricted degree (FIG. 3) or to isolate them from each other (FIG. 2), by virtue of fluid-tight sliding within the body 13.

Operation is as follows:

The equipment makes it possible to perform two functions using a single pump:

(1) to feed a steering system 3 with a specified maximum pressure, for example 140 bars;

(2) to feed a brake circuit 4 with a pressure: $P_{break} = f$ (force on pedal), with a maximum brake pressure that can be less than the steering system pressure, for example 90 bars.

These two functions may be performed independently or simultaneously.

The pressure feed to the brakes is obtained at 4 by means of a calibratable pressure reduction member 12. The upstream circuit 2 which feeds the steering function being of the open center kind, the feed to the pressure reducer 12 is obtained by means of a calibratable valve type system (FIG. 1).

Figure 2:
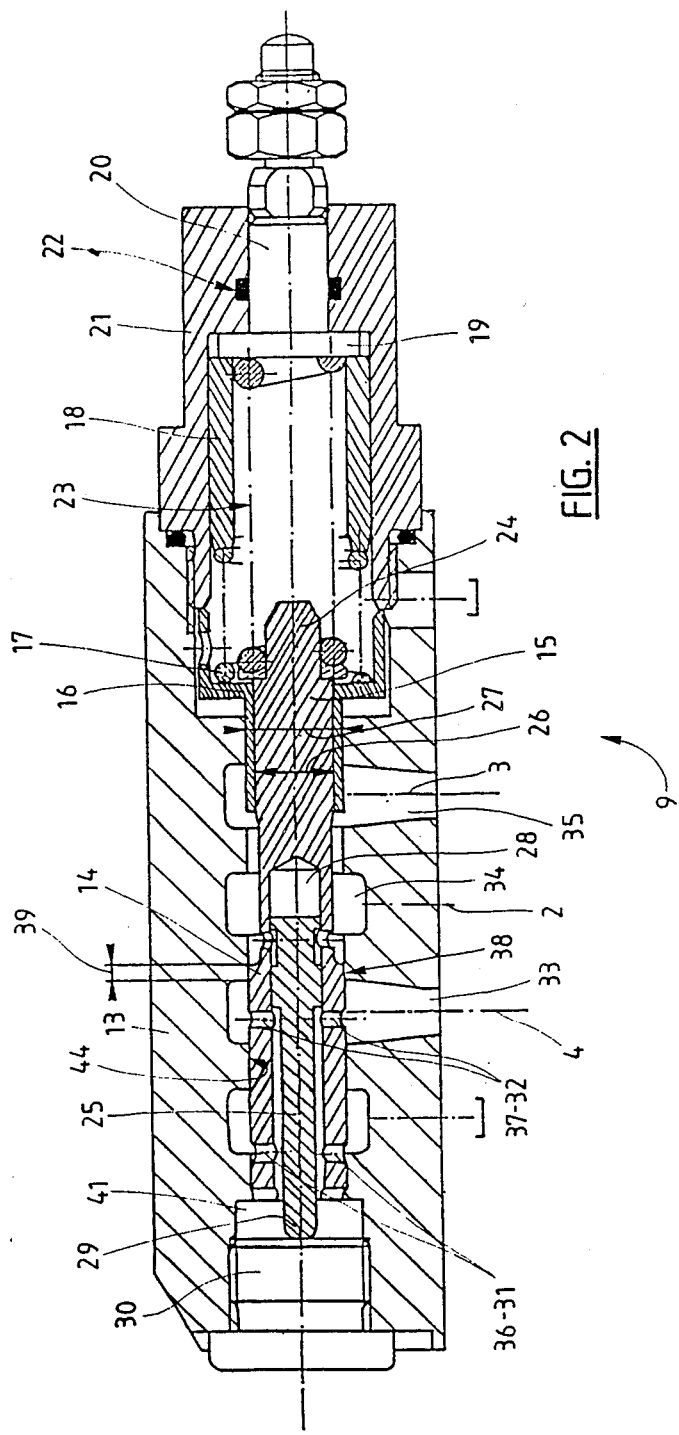
FIG. 2 is a longitudinal cross-section through the valve in question when it is in a neutral position, that is to say when the steering circuit is connected continuously and the braking circuit is not operated.

FIG. 2 shows the valve 9 in the unoperated position. In the absence of any force on the plunger 20 the groove 33 of the brake circuit is connected to the brake return groove 32 through the intermediary of the lateral holes 36 and 37 in the main piston 14. The valve member 16 bears against the cap 21. There is thus a free passage between the pressure inlet groove 34 and the groove 35 connected to the steering function 3, whereas the passage between the pressure inlet groove 34 and the brake groove 33 is closed off by the main piston 14.

In this configuration passage is provided from the pump 1 to the steering function 3, the brake function 4 being connected to the return line 32 (FIG. 1). The piston 25 serves to balance the annular cross-section of the valve 16 between the diameters 26 and 27. Also, the piston 25 procures dynamic balancing of the main piston 14 by virtue of the dashpot effect.

The whole corresponds to a dead travel 39 (FIG. 2).

Figure 3:
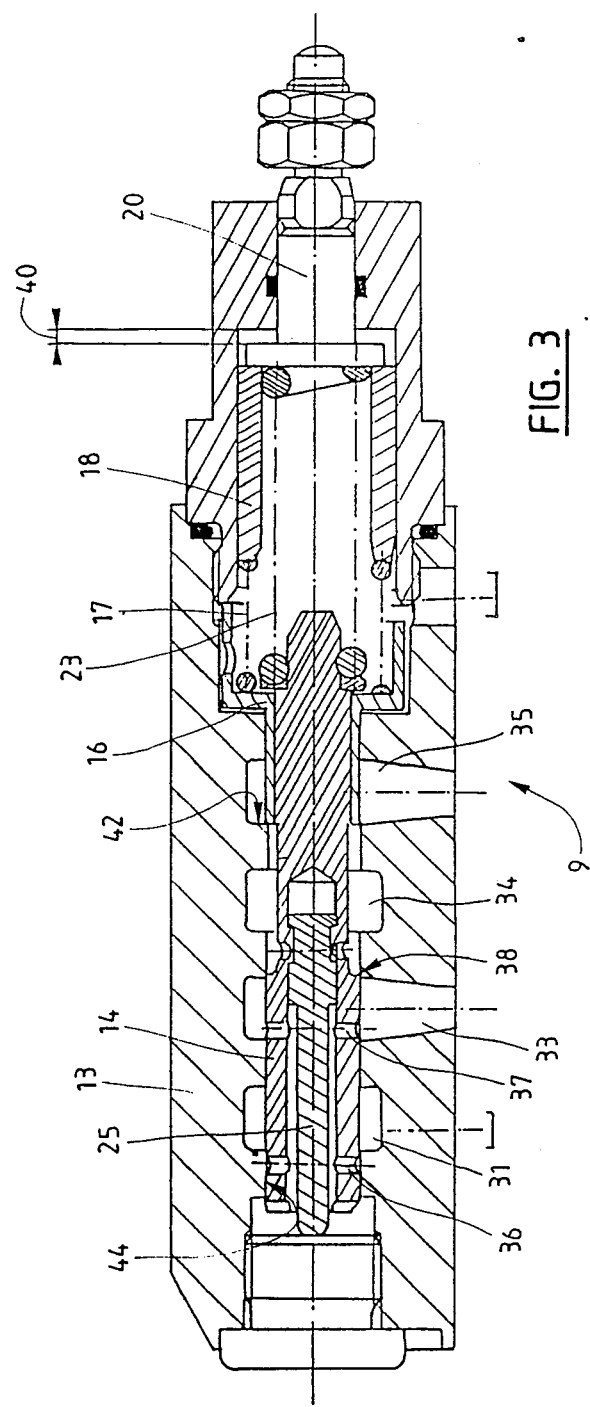
FIG. 3 is an analogous cross-section when the user operates the braking circuit, the steering circuit continuing to be supplied as usual.

FIG. 3 shows the valve in the braking position. When a force is applied to the plunger 20 the compression of the spring 17 situated between the ring 18 and the valve member 16 causes a rise in pressure in the pressure inlet groove 34 such that:

$$Pe \times Sc = Kl \times X$$

in which:
Pe = inlet pressure in groove 34;
Sc = annular cross-section of valve member 16 between guide diameters 26 and 27;
K1 = thickness of spring 17;
X = travel of plunger 20 - dead travel 40.

At the same time, compression of the spring 23 displaces the main piston inside the body 13. The lateral holes 36 in the main piston 14 are then closed off, preventing coupling of the brake groove 33 to the brake return groove 31/32. The lateral holes 37 continue to provide a coupling between the brake groove 33 and the chamber 31 formed in the body 13 around the foot 29. The hydraulic braking of the edge 38 then authorizes movement of the pressure inlet groove at the orifice 34 towards the braking groove 33, and this in such a way that:

$$P_{break} \times ST = K2 \times X$$

where:
ST = annular cross-section of main piston 14 between the outside diameter of main piston and the diameter of piston 25;
K2 = thickness of spring 23.

When this condition is satisfied, the main piston 14 moves back and the edge 38 cuts off the passage from 34 to 33. The lateral holes 36 are still not uncovered and so continue to close off the passage from 33 to 31. The brake pressure is therefore proportional to the force on the plunger 20.

In the braking position the connection from the pressure inlet 34 to the steering function 35 is still provided by the passage corresponding to lifting of the valve 16 relative to the edge 42 of the body 13.

The equipment in accordance with the invention has the following advantages:

it enables simultaneous or independent supply of a hydraulic steering system and a braking system using a single pump, it enables pressure limiting in the braking circuit to a known valve, compatible with the durability of the braking system seals; and it enables progressive braking according to the force on the pedal.

We claim:

1. A hydraulic power circuit comprising an hydraulic valve adapted to be connected between a pressurized fluid supply line and first and second lines feeding respective first and second circuits with different functions, said valve comprising:
 a first fluid flow control member controlled by control means and connecting said supply line to said first circuit through said first line;
 a two-position distributor device controlled by said control means and connecting said second line of said second circuit either to said supply line or to a return line,
 a second fluid flow control member in said second line having an adjustable passageway adapted to respond to opposite actions from said control means and from backpressure downstream in said second line, and comprising dashpot effect dampening means.

2. Hydraulic power circuit according to claim 1, comprising a valve body, a bore in said valve body, a supply inlet groove provided in said valve body around said bore, a first outlet groove provided in said body around said bore and adapted to be connected to said first line, a hollow cylindrical main piston adapted to slide in said bore, a head at one end of said main piston, a valve member of said first fluid flow control member, a skirt on said valve member adapted to slide around said head, so as to selectively connect said supply inlet groove and said first outlet groove, a helical compression spring supported on a rear rend of said valve member, a plunger of said control means, a fixed cap closing said body through which said plunger projects outside said body, a flange on said plunger and a ring abutting against said flange and adapted to exert thrust on said spring, and a second helical compression spring between said flange and said head of said hollow cylindrical main piston.

3. Hydraulic power circuit according to claim 2, wherein said two-piston distributor device comprises holes through said hollow cylindrical main piston, said holes adapted to connect or not, depending on the position of said hollow cylindrical main piston in said bore, a second outlet groove provided in said valve body around said bore and adapted to be connected to said second line, with a return outlet adapted to be connected to said return line.

4. Hydraulic power circuit according to claim 3, wherein said second fluid flow control member comprises a circular edge on the outside of said main piston adapted to provide a variably restricted connection of said supply inlet groove with said second outlet groove.

5. Hydraulic power circuit according to claim 4, wherein said dampening means comprises a second piston sliding within said hollow cylindrical main piston so as to determine a dampening chamber inside said hollow main piston, said second piston axially abutting against a plug fixed with respect to said valve body.

6. Hydraulic power circuit according to claim 5, wherein said valve member has an annular cross-section, and said second piston has a cross-section adapted to balance said annular crosssection.

7. Hydraulic power circuit according to claim 2, wherein said first fluid flow control member comprises means for connection to a steering circuit in a vehicle.

8. Hydraulic power circuit according to claim 2, wherein said second fluid flow control member comprises means for connection to a braking circuit of a vehicle, whereby said second control member constitutes means to apply to said braking circuit a pressure depending on a force exerted by an user on said control means via a brake pedal in said vehicle.

9. A hydraulic valve comprising:
- a pressurized fluid supply inlet and first and second outlets;
- a first fluid flow control member connected between said fluid supply inlet and said first outlet;
- a two position distributor device connected to said fluid supply inlet in parallel to said first fluid flow control member;
- a second fluid flow control member connected between a first outlet of said two-position distributor device and said second outlet;
- a drain outlet connected to a second outlet of said two-position distributor device; and
- a control means for controlling said first and second fluid flow control member and said two-position distributor device.

10. Hydraulic valve according to claim 9, comprising a valve body, a bore in said valve body, a supply inlet groove provided in said valve body around said bore connected to said fluid supply inlet, a first outlet groove provided in said body around said bore and connected to said first outlet, a hollow cylindrical main piston adapted to slide in said bore, a head at one end of said main piston, a valve member of said first fluid flow control member, a skirt on said valve member adapted to slide around said head, so as to selectively connect said supply inlet groove and said first outlet groove, a helical compression spring supported on a rear end of said valve member, a plunger of said control means, a fixed cap closing said body through which said plunger projects outside said body, a flange on said plunger and a ring abutting against said flange and adapted to exert thrust on said spring, and a second helical compression spring between said flange and said head of said hollow cylindrical main piston.

11. Hydraulic valve according to claim 10, wherein said two-position distributor device comprises holes through said hollow cylindrical main piston, said holes adapted to connect or not, depending on the position of said hollow cylindrical main piston in said bore, a second outlet groove provided in said valve body around said bore and connected to said second outlet, with said drain outlet.

12. Hydraulic valve according to claim 11 wherein said second control fluid flow member comprises a circular edge on the outside of said main piston adapted to provide a variably restricted connection of said supply inlet groove with said second outlet groove.

13. Hydraulic valve according to claim 12, wherein said dampening means comprises a second piston sliding within said hollow cylindrical main piston so as to determine a dampening chamber inside said hollow main piston, said second piston axially abutting against a plug fixed with respect to said valve body.

14. Hydraulic valve according to claim 13, wherein said valve member has an annular cross-section, and said second piston has a cross-section adapted to balance said annular crosssection.

15. Hydraulic valve according to claim 9, wherein said first fluid flow control member is intended to be connected to a steering circuit in a vehicle.

16. Hydraulic valve according to claim 9, wherein said second fluid flow control member is intended to be connected to a breaking circuit in a vehicle, whereby said second control member is adapted to apply to said braking circuit a pressure depending on a force exerted by an user on said control means via a brake pedal in said vehicle.

* * * * *